United States Patent
Blanc et al.

(10) Patent No.: US 7,272,522 B2
(45) Date of Patent: *Sep. 18, 2007

(54) METHOD AND SYSTEMS FOR OPTIMIZING HIGH-SPEED SIGNAL TRANSMISSION

(75) Inventors: Alain Blanc, Tourrettes sur Loup (FR); Patrick Jeanniot, La Gaude (FR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/235,856

(22) Filed: Sep. 27, 2005

(65) Prior Publication Data

US 2006/0025945 A1    Feb. 2, 2006

Related U.S. Application Data

(63) Continuation of application No. 10/697,832, filed on Oct. 30, 2003, now Pat. No. 6,990,418.

(30) Foreign Application Priority Data

Dec. 19, 2002   (FR)   ................................ 02 368144

(51) Int. Cl.
*G01R 13/00* (2006.01)
*H04B 17/00* (2006.01)

(52) U.S. Cl. .......................................... 702/69; 375/225

(58) Field of Classification Search ................. 702/69, 702/84, 194; 375/225, 226, 371, 355, 358, 375/362

See application file for complete search history.

(56) References Cited

U.S. PATENT DOCUMENTS 4,029,904 A * 6/1977 Papeschi ..................... 375/318

(Continued)

OTHER PUBLICATIONS

Schreiner et al., Automatic Distortion Correction for Efficient Pulse Transmission, Jan. 1965, IBM Journal, pp. 20-30.*

(Continued)

*Primary Examiner*—Donald E. McElheny, Jr.
*Assistant Examiner*—Toan M. Le
(74) *Attorney, Agent, or Firm*—Joscelyn G. Cockburn; Anthony M. Del Zoppo, III; Driggs, Hogg & Fry Co. LPA

(57) ABSTRACT

A method and systems for automatically adjusting the parameters of signal emitter in a synchronous high-speed transmission system, is disclosed. According to the method of the invention, the quality of a high-speed received signal is analyzed for a plurality of sets of parameter values and the one producing the best signal quality is selected. In a first embodiment, the quality of the high-speed received signal is determined by analyzing a digital eye characterizing the signal behavior, obtained by over-sampling the high-speed received signal. In a second embodiment, the quality of the high-speed received signal is determined by analyzing the behavior of the phase rotator used for data sampling. Finally, in a third embodiment, the quality of the high-speed received signal is determined by analyzing a digital eye, obtained by moving the position of a phase rotator from one end to the other and sampling data at each position.

20 Claims, 7 Drawing Sheets

U.S. PATENT DOCUMENTS

| | | | | |
|---|---|---|---|---|
| 4,320,526 | A | | 3/1982 | Gitlin ................... 375/371 |
| 4,320,528 | A | * | 3/1982 | Scharton et al. ............ 376/310 |
| 4,654,861 | A | * | 3/1987 | Godard ................... 375/226 |
| 4,856,025 | A | * | 8/1989 | Takai ..................... 375/267 |
| 5,333,147 | A | * | 7/1994 | Nohara et al. ............. 375/224 |
| 5,598,439 | A | * | 1/1997 | Wagner ................... 375/326 |
| 5,712,884 | A | * | 1/1998 | Jeong ..................... 375/375 |
| 5,757,857 | A | * | 5/1998 | Buchwald ................. 375/271 |
| 5,870,438 | A | * | 2/1999 | Olafsson .................. 375/344 |
| 5,978,419 | A | * | 11/1999 | Cassiday et al. ........... 375/257 |
| 6,563,888 | B1 | * | 5/2003 | Toriyama .................. 375/340 |
| 6,609,085 | B1 | * | 8/2003 | Uemura et al. ............. 702/189 |
| 6,694,273 | B2 | * | 2/2004 | Kurooka et al. ............. 702/69 |
| 6,990,418 | B2 | * | 1/2006 | Blanc et al. ............... 702/69 |
| 2002/0123851 | A1 | * | 9/2002 | Kurooka et al. ............. 702/69 |
| 2004/0136451 | A1 | * | 7/2004 | Blanc et al. ............... 375/226 |

OTHER PUBLICATIONS

Schreiner et al, Automatic Distortion Correction for Efficient Pulse Transmission, Jan. 1965, IBM Journal, pp. 20-30.

Bateman et al, Adjustment of Predetection Filters in High-Speed Data Transmission Systems, Dec. 1990, IEEE Proceedings, vol. 137, Pt. 1, No. 6, pp. 355-364.

Foley et al, A Low-Power 8-PAM Serial Transceiver in 0.5-microm Digital CMOS, Mar. 2002, IEEE Journal of Solid-State Circuits, vol. 37, No. 3, pp. 310-316.

\* cited by examiner

```
400-1 ─ 000011111111111111111111111111111111000000
405-1 ─ 000011111111111111111111111111111111000000
XOR   .0001000000000000000000000000000000100000.
410-1

400-2 ─ 000111111111111111111111111111111111100000
405-2 ─ 000111111111111111111111111111111111100000
XOR   .0010000000000000000000000000000000010000.
410-2

400-3 ─ 110000000000000000000000000000000001111111
405-3 ─ 110000000000000000000000000000000001111111
XOR   .0100000000000000000000000000000001000000.
410-3

400-4 ─ 000001111111111111111111111111111110000000
405-4 ─ 000001111111111111111111111111111110000000
XOR   .0000100000000000000000000000000001000000.
410-4

• • •

400-n ─ 000011111111111111111111111111111111100000
405-n ─ 000011111111111111111111111111111111100000
XOR   .0001000000000000000000000000000000010000.
410-n

415 ─ .0001000000000000000000000000000000100000.
      .0001000000000000000000000000000000100000.
      .0010000000000000000000000000000000010000.
OR    .0011000000000000000000000000000000110000.
      .0011000000000000000000000000000000110000.
      .0100000000000000000000000000000001000000.
OR    .0111000000000000000000000000000001110000.
      .0111000000000000000000000000000001110000.
      .0000100000000000000000000000000001000000.
OR    .0111100000000000000000000000000001110000.

• • •

.0111100000000000000000000000000001110000.
      .0001000000000000000000000000000000010000.
OR    .0111100000000000000000000000000001110000.
                                              ─ 415

|─L₁─|─────────L₂─────────|

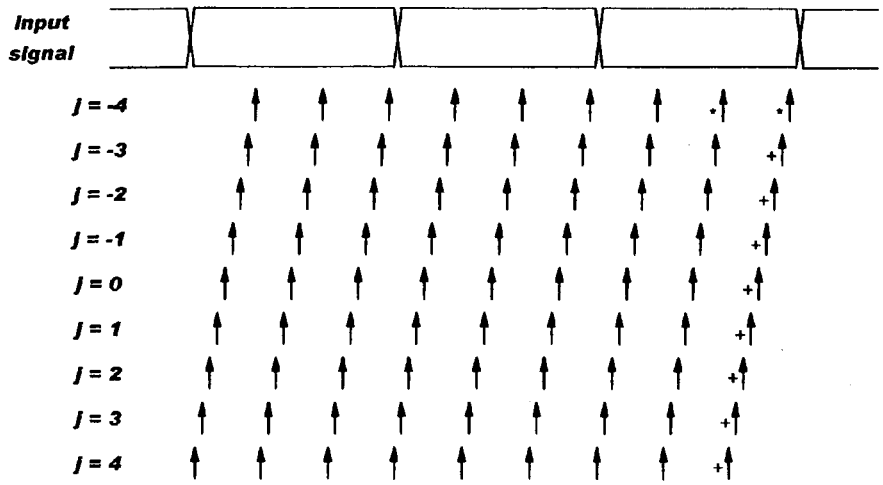
Figure 9a
Figure 9b
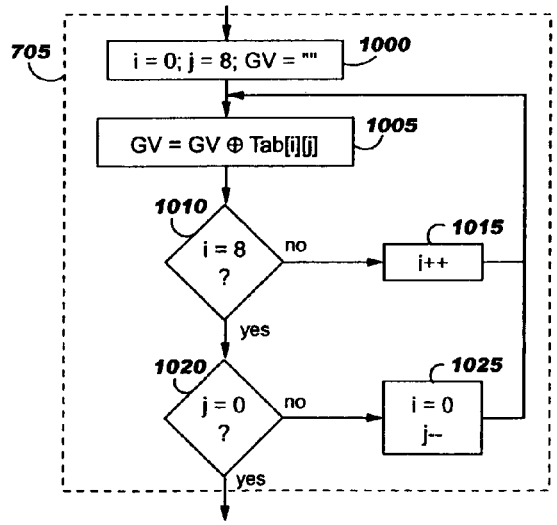
Figure 10

METHOD AND SYSTEMS FOR OPTIMIZING HIGH-SPEED SIGNAL TRANSMISSION

RELATED APPLICATIONS

This application is a continuation of application Ser. No. 10/697,832, filed Oct. 30, 2003 now U.S. Pat. No. 6,990,418, which claims priority of EP application Serial No. 02368144.8, filed Dec. 19, 2002.

FIELD OF THE INVENTION

The present invention relates generally to high-speed signal transmission and, more specifically, to a method and systems for automatically adjusting control parameters of signal emitting means.

BACKGROUND OF THE INVENTION

The rate at which data are transmitted through communication networks has dramatically increased in recent years, fueled by progresses achieved in fiber and optoelectronic devices and techniques, such as DWDM (Dense Wavelength Division Multiplexing), which allows multiplication of the bandwidth of a single fiber by merging many wavelengths on it. As a result, telecommunications and networking industry had to develop devices capable of routing and switching the resulting huge amount of data that converge and must be dispatched at each network node. Typically, routers and switches situated at those network nodes have now to cope with the requirement of having to move data at aggregate rates that must be expressed in hundredths of giga ($10^9$) bits per second while multi tera ($10^{12}$) bits per second rates must be considered for the new devices under development.

Even though considerable progress has been made in optoelectronics, allowing high levels of performance in the transport of data from node to node, it remains that switching and routing of the data is still done in the electrical domain at each network node. Working in electrical domain occurs because there is no optical memory available yet that would permit storing temporarily the frames of transmitted data while they are examined to determine their final destination. This must still be done in the electrical domain using the traditional semiconductor technologies and memories.

Improvements in semiconductor processes are making it possible to develop integrated circuits of increasing size and complexity. As a consequence, since the clock rates reach very high frequency, signals carrying data must be of high quality to detect logic levels. However, signals carrying data are subject to attenuation and distortion resulting from transmission media properties. To reduce the number of transmission errors, a correction mechanism, e.g. an equalizer, or a distortion compensation, e.g., a Finite Impulse Response (FIR) filter, is generally implemented in the transmission system. Correction mechanism is implemented in the receiver side while distortion compensation mechanism is implemented in the emitter side. It is generally advantageous to compensate distortion prior to transmission. Distortion compensation mechanisms could be, i.e., parameters are automatically evaluated, or determined by simulating the behavior of the transmission media.

Even though automatic mechanisms present the advantage of providing adapted parameter values, they are surface and power consuming. For this reason, integrated communication systems, such as switches or routers, are generally using distortion compensation mechanisms where parameters are determined by simulation and could be 'manually' adjusted.

Therefore, there is a need for a method and systems for automatically determining the parameter values of signal emitting means, without increasing their complexity nor their power consumption.

SUMMARY OF THE INVENTION

Thus, it is a broad object of the invention to remedy the shortcomings of the prior art as described here above.

It is another object of the invention to provide a method and systems adapted to automatically adjust the parameters of signal emitting means, without increasing their complexity nor their power consumption.

It is a further object of the invention to provide a method and systems adapted to automatically adjust the parameters of signal emitting means, without perturbing the transmission system.

It is still a further object of the invention to provide a method and systems adapted to automatically adjust the parameters of signal emitting means by analyzing the quality of high-speed received signals.

The accomplishment of these and other related objects is achieved by a method for automatically adjusting parameters of signal emitting means of a synchronous high-speed transmission system wherein controlling means of signal receiving means could transmit information to controlling means of said signal emitting means, said method comprising the steps of:

selecting a first subset of values in a predetermined set of values;

sending a request to said controlling means of said signal emitting means for setting said parameters to the values of said selected subset;

evaluating the quality of the signal received by said signal receiving means;

if all subsets of said predetermined set of values have been selected, determining the subset corresponding to the best signal quality and sending a request to said controlling means of said signal emitting means for setting said parameters to the values of said determined subset;

else, selecting a different subset in said predetermined set of values and repeating the last three steps.

Further advantages of the present invention will become apparent to the ones skilled in the art upon examination of the drawings and detailed description. It is intended that any additional advantages be incorporated herein.

BRIEF DESCRIPTION OF THE DRAWINGS

FIGS. 3 and 4 illustrate the method of a first embodiment for analyzing the quality of a high-speed signal by oversampling.

FIG. 9, comprising FIGS. 9a and 9b, illustrates the data acquisition and formatting principles that are used by the method of the third embodiment.

FIG. 10 represents an example of the algorithm used to format acquired data according to the third embodiment.

DETAILED DESCRIPTION OF THE PREFERRED EMBODIMENT

Figure 1:
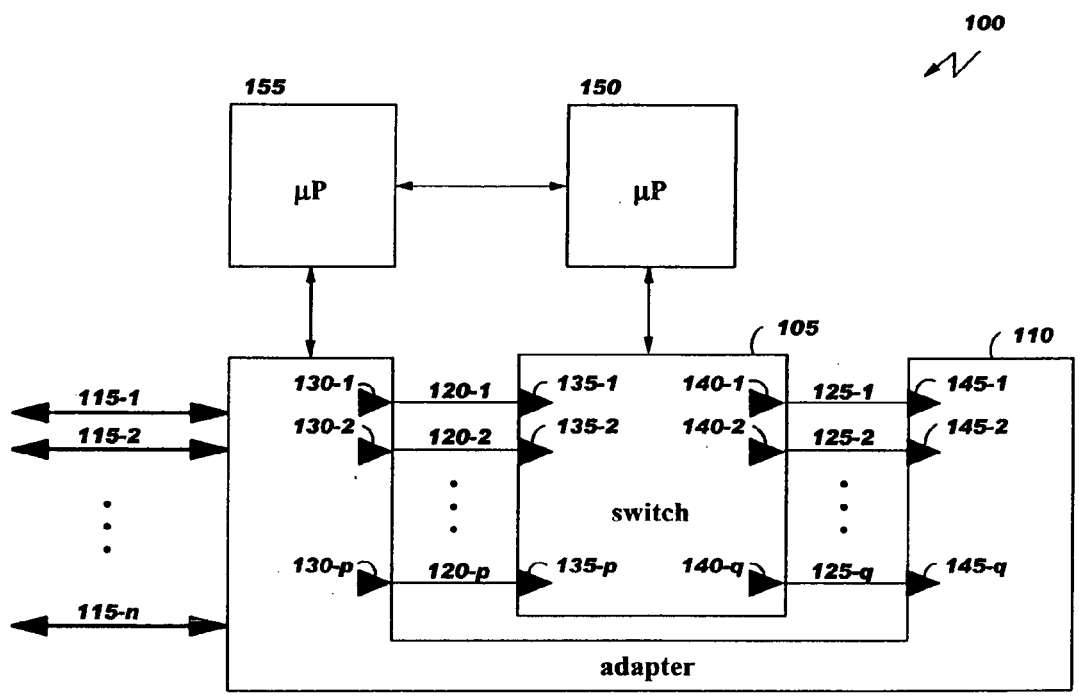
FIG. 1 shows schematically the architecture of a switching system wherein the method of the invention may be implemented.

FIG. 1 illustrates schematically the architecture of a switching system 100 wherein the method of the invention may be implemented. Switching system 100 comprises a switch core 105 and an adapter 110 used for data processing, e.g., packet analysis and queuing. Adapter 110 is connected to a network (not represented for sake of clarity) through communication channels 115-1 to 115-$n$. Data are transferred from adapter 110 to switch core 105 through high-speed links 120-1 to 120-$p$ and from switch core 105 to adapter 110 through high-speed links 125-1 to 125-$q$. Each high-speed link transfers data from an emitter to a receiver. For example, high-speed link 120-1 transfers data from emitter 130-1 to receiver 135-1 and high-speed link 125-1 transfers data from emitter 140-1 to receiver 145-1. In this example, each emitter may be tuned by modifying parameter values, e.g., each emitter includes a distortion compensation mechanism, such as a FIR filter, and each receiver includes means for evaluating the quality of the high-speed signal received through corresponding high-speed link. Switch core 105 is controlled by microprocessor 150 and adapter 110 is controlled by microprocessor 155. Microprocessors 150 and 155 are linked directly (as represented) or through a supervisor module.

According to the method of the invention, the best set of parameters of signal emitting means is determined by analyzing the quality of the high-speed received signal for each predetermined set of parameter values. To that end, the microprocessor associated to the receiver of a high-speed link sends a request to the microprocessor associated to the corresponding emitter to set parameter values of the signal emitting means to a first set of values. Then, the microprocessor associated to the receiver analyzes the quality of the high-speed received signal. When the quality of the high-speed received signal is evaluated, the microprocessor associated to the receiver sends a request to the microprocessor associated to the emitter to set parameter values of the signal emitting means to a second set of values and the quality of the high-speed received signal is evaluated again. This process is repeated for all sets of parameter values. Therefore, at the end of the process, the parameter values having produced the best signal quality may be determined. Naturally, microprocessors may be replaced by microcontrollers, or any other controlling means, without changing the principle of the invention, provided that controlling means associated to signal receiver means could transmit information, directly or not, to controlling means associated to signal emitting means.

Figure 2:
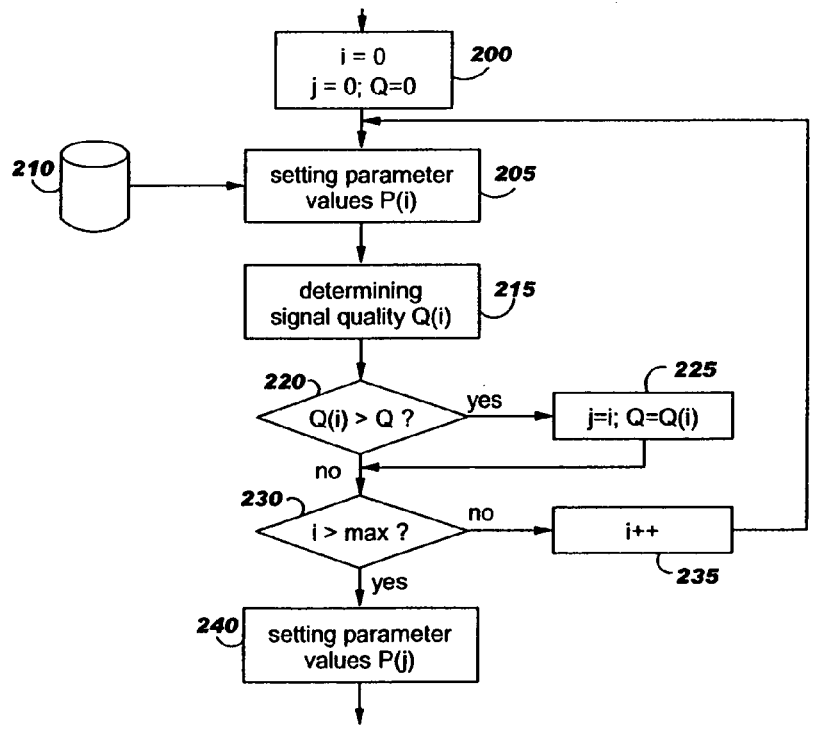
FIG. 2 is an example of the algorithm of the method of the invention.

FIG. 2 shows an example of the algorithm of such method. A first variable i, representing an index in a predetermined table (210) of sets of parameter values, a second variable j, representing the index of the best set of parameter values, and a third variable Q, representing a signal quality value, are set to zero (box 200). In this example, the greater the quality value is, the better the signal quality is. Then, the parameters are set to values P(i), associated to the value of variable i according to table 210, (box 205) and the quality Q(i) of the high-speed received signal is determined (box 215). If the quality Q(i) is greater than quality Q (box 220), variable j is set to the value of variable i and variable Q is set to the value of variable Q(i) (box 225). Then, a test is performed to determine whether or not the parameters of the signal emitting means have been set to all predetermined values stored in table 210, i.e., variable i has reached its maximum value (box 230). If variable i has not reached its maximum value, variable i is incremented by one (box 235) and the last five steps (205 to 230) are repeated. Else, the parameters are set to values P(j), corresponding to the best signal quality Q that has been measured (box 240).

Figure 3:
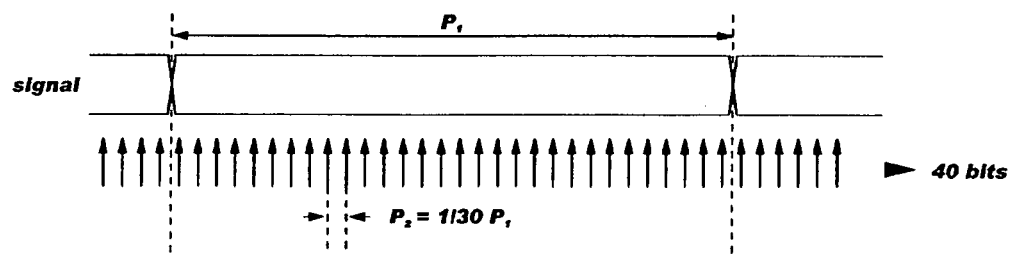

According to a first embodiment, the determination of the quality of the high-speed received signal consists in oversampling the high-speed received signal and accumulating results so as to determine where transitions take place. High-speed signal receivers are often based upon an oversampling mechanism used to analyze signal transitions so as to determine the signal clock and, thus, the best bit sampling position. This mechanism may be used to analyze the quality of the high-speed received signal. FIGS. 3 and 4 illustrate such solution. As shown in FIG. 3, a signal having a period $P_1$ may be sampled by a system based on a clock having a period $P_2$ smaller than $P_1$, in this example, $P_2=P_1/30$. Sampled points are memorized in a register, for example a 40 bit register. FIG. 4 represents an example illustrating this method. At time i, a first set of sampled points 400-1 is memorized in the above mentioned 40 bit register and an XOR operation is performed between these sampled points and the sames, shifted of 1 bit to the right, referred to as 405-1, to obtain result 410-1 characterizing the signal transition locations. Result 410-1 is memorized in a 39 bit register. Signal transitions took place where a bit equal to 1 has been found. Then, at time i+1, a new set of sampled points 400-2 is memorized in the same 40 bit register and the XOR operation is performed between these sampled points and the sames, shifted of 1 bit to the right, referred to as 405-2, to obtain result 410-2. An OR operation is performed on this result 410-2 and the value stored in the 39 bit register. The OR result is stored in the 39 bit register, replacing the previous result. Then, the process is repeated at time i+2, and so on. At the end of the process, the value 415 stored in the 39 bit register characterizes the quality of the high-speed received signal by showing all the positions wherein the signal transitions took place. This representation is referred to as a digital eye. Therefore, the quality Q may be determined, for example, by counting the number of 0 per period. Considering the previous example, the quality is Q=27. It is to be noticed that the process must run during a sufficient period to analyze an important number of signal transitions.

To use efficiently this method, the clock rate of the signal must be a multiple of the clock rate of the sampling system and the ratio of these clock rates must be large enough. As a consequence, it cannot be used to analyze a system wherein the clock rate is such that it is not possible to sample points with an adequate clock rate due to technology limits. For example, considering a data communication link running at 2.5 Gbps, sampling 30 values per clock period means that a value must be sampled each 13.3 ps. Such sampling rate may not be reached at a reasonable cost when considering the required accuracy of clock shift and the latch power consumption.

In second and third embodiments, the determination of the quality of the high-speed received signal is based upon the receiver of an HSS system, where the previous method cannot be used.

Figure 5:
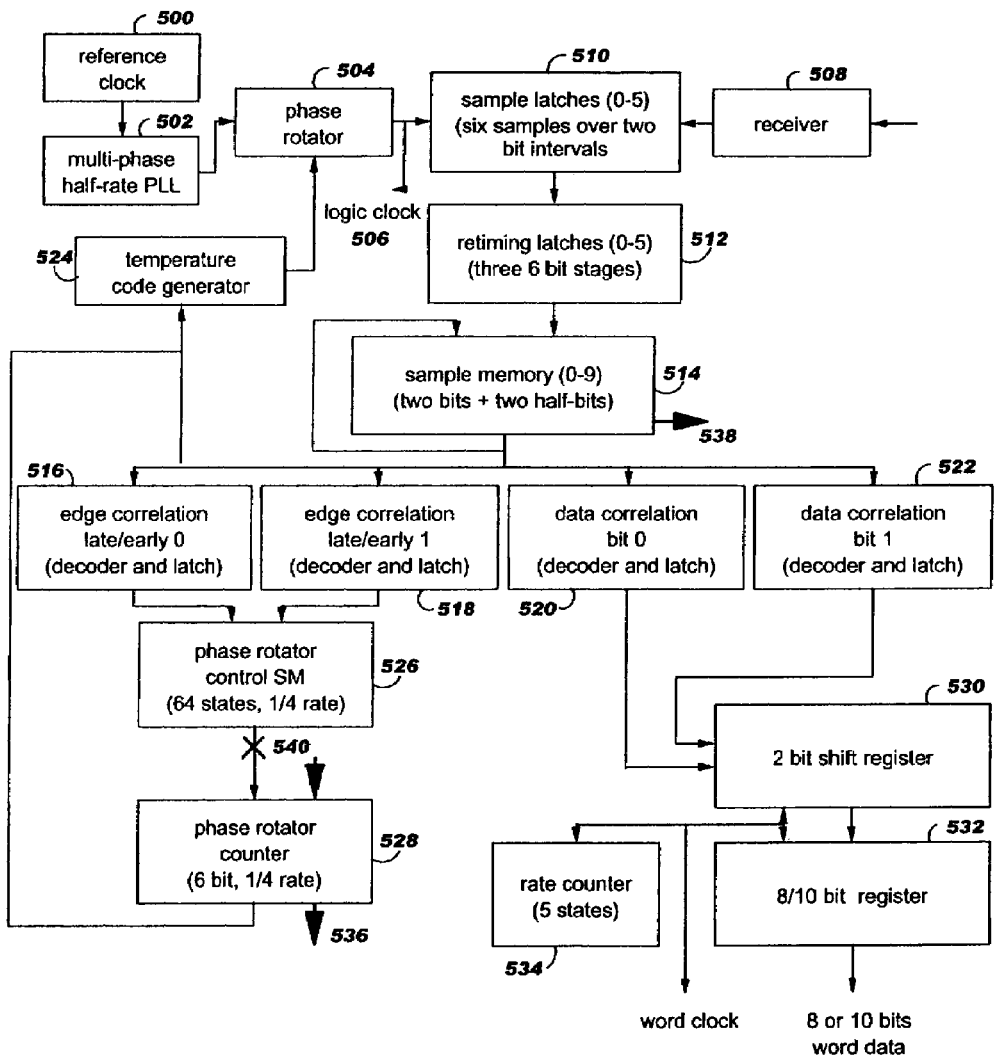
FIG. 5 illustrates the architecture of the receiver of an HSS macro with which the method of the invention may be used.

FIG. 5 illustrates a block diagram of the receiver architecture described in U.S. Patent Application No. 2002/0094055. A PLL 502 receives a signal from a reference clock 500. The PLL controls a voltage controlled three-stage ring oscillator (VCO) running at half the bit frequency. The PLL is shared with four receivers, one, 508 being shown. The six phases from the VCO are fed into a phase rotator 504 having 54 steps for a 2 bit time interval. The 54 steps are generated with a phase rotator having six phases with three inter-slice phase steps further divided by three.

The six outputs of the rotator 504 are buffered, and the edges are shaped to be able to sample a signal having twice the frequency. One of the phase outputs is used as local recovered clock 506. A clock buffer makes sure that it is not over-loading the phase rotator. Timing analysis determines which phase is the optimum to use. The output section of the phase rotator suppresses common mode signals and performs a limiting signal.

The output is then driven out (with the signals from the phase rotator) to the phase buffers and to a sample latch complex 510 which, in turn, provides clocks. Six samples are taken over a two-bit interval. The sample latch complex is a CMOS, positive edge triggered latch. It takes differential data inputs and, with a single ended clock, outputs a single ended logic level signal. The complex consists of two circuits, the latch itself and a buffer that sharpens the output to the receive logic. The retiming latches 512 reduce the probability of a metastable state to a value much lower than the targeted bit error rate. It is also helping to align the data to one single clock phase. In order to be able to process information from more than one bit interval for the recovery of one data bit, a memory stage 514 reuses four samples from the previous sampling period. A total of ten samples is, therefore, fed into the half rate edge and data detection correlation blocks 516, 518, 520, 522 that make use of a pattern recognition algorithm. Truth tables represent the initial best guess for the data.

The outputs of the edge and data detection block are the recovered two bit and the early and late signals going to the phase rotator control state machine 526. This involves the use of a bang-bang control circuit with adaptive step size. The state machine can be viewed as a digital filter that evaluates the early and late signals and commands an adjustment of the sample point. The rotator counter and temperature code generator 524 generates the 54 control signals for the phase rotator, and this closes the clock and data recovery control loop.

The data path consists of a shift register 530 which loads two bits from the data correlation blocks during each half-rate cycle. The shift register is loaded to a word data register 532 (eight or ten bits) using a word clock derived from the PLL clock. A rate counter 534 monitors the shift register 530 and the eight/ten bit register 532.

The method for the phase rotator control is an advanced bang-bang state machine. It involves eight-fold initial early/late averaging. It has sixteen states and may be implemented using four latches. The state machine 526 has two inputs, one for early and one for late. The averaging effect is achieved in the following manner. The state machine is set to eight. If several early signals in a row, but not enough to drive the state to '1', are followed by several late signals, the state machine averages them out. However, when a preponderance of early or late signals takes the state machine to '1' or '14', the state machine determines that the sampling is occurring too early or too late and determines whether to change the sample point. The state machine produces a 'down' signal when it gets to a state '1' and an 'up' signal when it gets to a state '14'. This output signal from the state machine, if it is a 'down', instructs the rotation counter to adjust the sampling to a later point. Conversely, an 'up' signal will instruct the counter to adjust the sampling to an earlier point.

The bang-bang control state machine is followed by an up and down counter with 54 steps (requiring six flip-flops) for the receiver with sample processing. The counter has 54 steps and controls where the sample point will be. The counter processes two bits at a time in parallel. Thus, there are 27 positions where the sample point can be set for each bit. That defines the limits of the resolution. As noted, the state machine determines whether to change the sample point and the counter determines where the new sample point will be.

According to the second embodiment of the invention, the quality of the high-speed received signal is determined by analyzing the behavior of the phase rotator 504. Since the high-speed signal transmitter and receiver are using a 'common' clock, the phase rotator is supposed to be stable after the bit synchronization. Thus, counting the number of different positions that are taken by the phase rotator gives an indication of the quality of the high-speed received signal. Likewise, the shape of the signal representing phase rotator behavior gives an indication of the high-speed received signal quality. For example, by reference to variable Q of FIG. 2, the high-speed received signal quality may be computed as follows, $$Q = N - Nb\_Pos \qquad (1)$$

wherein N is the total number of different positions of the phase rotator and Nb_Pos is the number of different positions that have been effectively reached by the phase rotator.

The phase rotator position may be easily and periodically read from the phase rotator counter 528, as illustrated by arrow 536 of FIG. 5.

Figure 6:
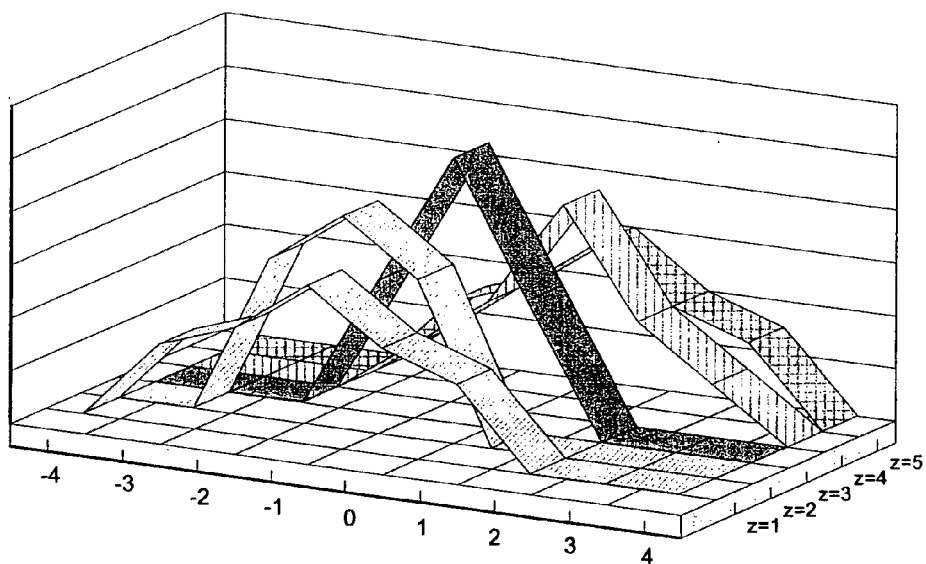
FIG. 6 is a graphical representation example of the phase rotator behavior.

FIG. 6 illustrates an example of phase rotator behavior for five different sets of parameter values ($z=1$ to 5). X axis represents the position of the phase rotator, Y axis represents the different sets of parameter values and Z axis represents the statistical distribution of the phase rotator position. Considering the first set of parameter ($z=1$), positions $-3$, $-2$, $-1$, 0 and 1 have been reached by the phase rotator and so, according to relation (1), the signal quality is 4, $Q=4$ ($Q=9-5$) i.e., the total number of positions (9) minus the number of positions reached by the phase rotator (5). Likewise, the signal quality is equal to 6, 6, 4 and 4 for sets of values $Z=2$, 3, 4 and 5, respectively. Therefore, at the end of the process, the parameter values of the signal emitting means are set to values corresponding to $z=2$ or $z=3$. As mentioned above, the choice of parameters depends upon the determination of the high-speed received signal quality and so, relation (1) may be improved to take into account the shape of the signal representing phase rotator as well as its centering.

According to the third embodiment, the high speed signal to be analyzed is virtually over-sampled by using the sampler 514 controlled by the phase rotator 504. Such virtual over-sampling, or time over-sampling, allows to increase artificially the number of signal sampling positions per clock period. Therefore, even though only n values may be simultaneously sampled, the use of a phase rotator having p positions corresponding to p−1 phase shifts of the sampler clock, allows to virtually sample n×p values, corresponding to n×p different positions. To that end, n values are simultaneously sampled for each of the p positions of the sampler clock phase and combined so as to obtain a "digital eye" characterizing the high-speed received signal quality. If such method cannot be used to analyze the signal values (sampling is performed on different clock period of the signal), it may be used efficiently to analyze the positions wherein signal transitions take place. Thus, the combination of the n values sampled for each of the p positions of the sampler clock phase characterizes n×p signal positions wherein signal transitions are analyzed. For example, considering a data communication link running at 2.5 Gbps, a sampling clock of 1.25 GHz, a 6 bits sampler and a phase rotator having nine positions, the method simulates a sampling of 27 values per signal bit, i.e. a sampling each 14.8 ps. Such method looks like analyzing the view through a window comprising n holes used to observe a fixed signal, while moving the window to p positions.

Figure 7:
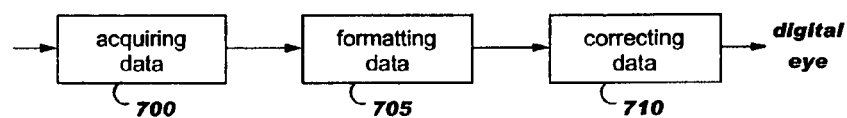
FIG. 7 illustrates the general principle of the method used to determine the quality of a high-speed received signal according to a third embodiment.

According to this embodiment, the data requested to construct the digital eye are sampled using the hardware described above so that it does not require a further hardware feature. The only requirement consists in accessing the content of sample memory 514 and controlling the phase rotator 504. Thus, data are sampled using sample register 514, as illustrated by arrow 538, and the associated phase rotator 504 is 'disconnected' from the phase rotator control state machine 526 to be 'locked' and 'externally controlled', as illustrated by cross and arrow 540. FIG. 7 illustrates the general principle of the method. After having acquired the data (box 700), data are formatted (box 705) before being corrected (box 710) to construct the digital eye. These general steps are described in detail by reference to FIGS. 8 to 12. For the sake of illustration, the phase rotator of the following description may reach nine positions, varying from −4 to 4 (right to left).

Figure 8:
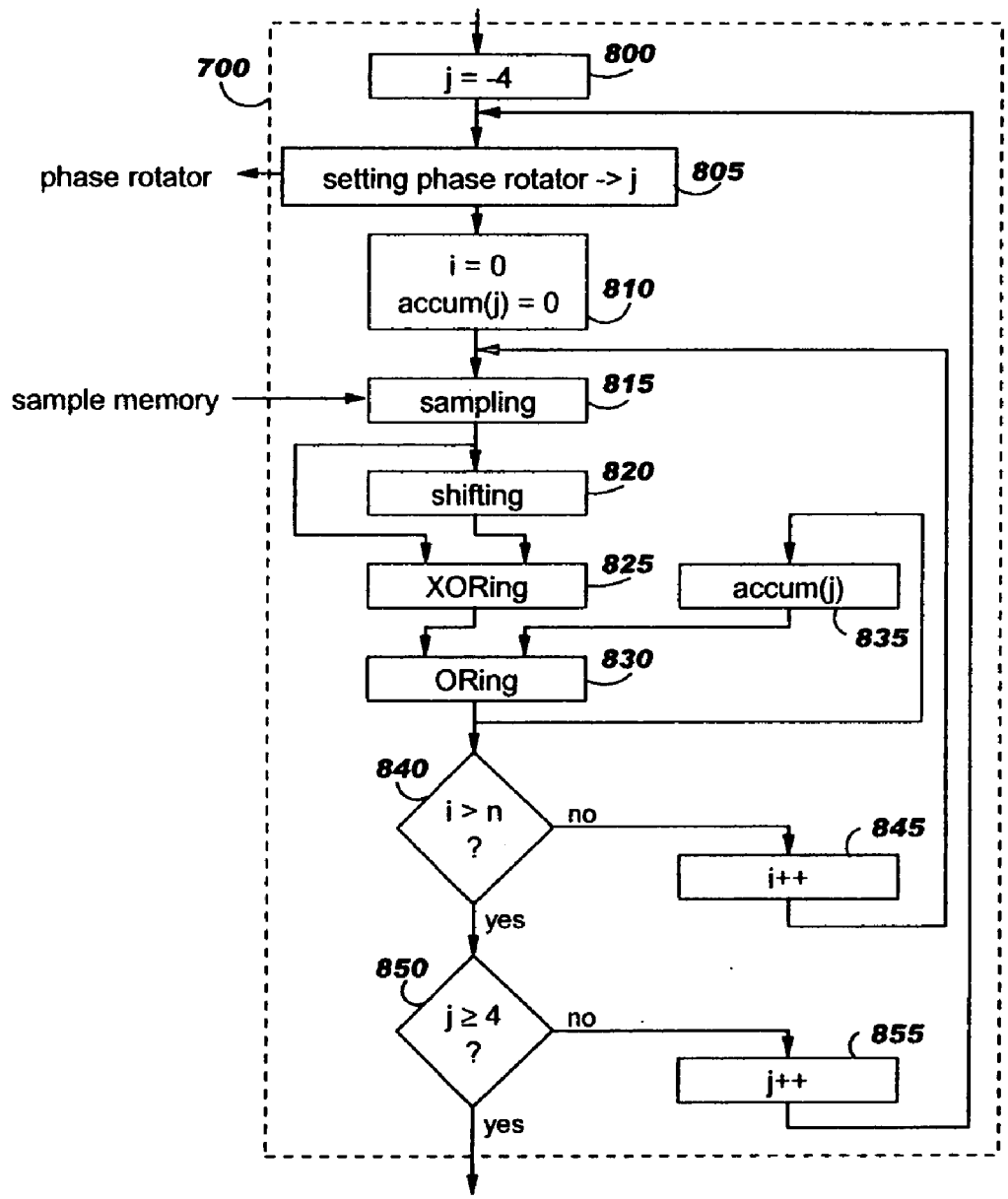
FIG. 8 represents an example of the algorithm used to acquire data according to the third embodiment.

FIG. 8 illustrates an algorithm example of the first step of the method, consisting in acquiring the data that are used to construct the digital eye. A first variable j, representing the phase rotator position, is set to its minimum value, i.e. −4 in this example (box 800) and the phase rotator is set to position j (box 805). Variables i and accum(j) are set to zero (box 810). The 10 bit sample register value is acquired from sampling unit (box 815) and shifted by one position to the right (box 820). The sample register value and the shifted sample register value are then XORed together (box 825), producing a nine bit value, and the result is ORed with a cumulated value associated to phase rotator position j, initialized to zero (box 830). The OR result, or cumulated value, is stored in a table having as many memory cells as the number of phase rotator positions, at position j (box 835). Then a test is performed to determine whether or not enough sample register values have been used, i.e. to compare variable i with a predetermined threshold n (box 840). In practice, n must be great enough so as to detect many signal transitions, but not too large so as to avoid errors due to phase rotator skew. If variable i is not greater than n, variable i is incremented by one (box 845) and the last six steps (boxes 815 to 840) are repeated. Else, if variable i is greater than n, a second test is performed to determine whether or not the phase rotator has been set to all its possible positions, i.e. variable j has reached its maximum value equal to 4 in this example (box 850). If variable j is less than 4, variable j is incremented by one (box 855) and the last ten steps (boxes 805 to 850) are repeated. Else, if variable j is greater than or equal to 4, the process is stopped.

The algorithm described by reference to FIG. 8 allows determination of values characterizing the edge positions of sampled signals, i.e. the positions wherein signal transitions have been detected at least once. According to this algorithm, a value equal to one means that an edge has been detected at least once at the corresponding position while value zero means that an edge has never been detected at the corresponding position.

FIG. 9a illustrates the relative positions wherein an edge analysis has been conducted, depending upon phase rotator position, and FIG. 9b shows the table wherein the values determined in box 830 of FIG. 8 are stored.

Turning now to FIG. 9a, it is illustrated the input signal to be sampled and the positions wherein edge analysis are conducted when the phase rotator is set successively to all the possible positions, i.e. when variable j varies from −4 to 4. The positions where edge analysis are conducted, referred to as analyzed positions, correspond to sampling positions, except for the ones at the utmost left due to the right shift performed in box 820 of FIG. 8. As it is apparent from this figure, the behavior of the input signal between two adjacent analyzed positions, for a particular position of the phase rotator, may be determined by analyzing results for the same analyzed positions for the other phase rotator positions. For example, the behavior of the input signal comprised in the time window determined by the first and the second analyzed positions when the phase rotator is set to position −4 (marked with an *), may be determined by using the eight analyzed positions given by the first analyzed position for the other phase rotator positions (marked with a +).

The values resulting from the algorithm of FIG. 8 may be arranged in a table, as illustrated in FIG. 9b, wherein each row corresponds to a particular value of j, i.e. a particular position of the phase rotator, and each column corresponds to a bit position of the stored values. From this table, the acquired data may be formatted (step 705 of FIG. 7) to create a global value. This global value is constructed by merging bits of stored values according to the arrows illustrated on the drawing, i.e. by merging the bits of the stored values according to the position order of the analyzed position associated to these bits. In other words, this global value is the concatenation of the bits of the table from top to bottom and from right to left.

Thus, in this example, the global value is:
0000011111111111111111110000000000111111111111
00000000000001111111 111111111110000

FIG. 10 illustrates the algorithm used to format the acquired data, i.e. box 705 of FIG. 7. An initialization phase consists in setting variable i to zero, variable j to the number of bits of the acquired data minus one, i.e. eight in this example, and the global value GV is emptied (box 1000). Then, the bit having coordinates (i,j), variable i representing the row and variable j the column, of the table mentioned above wherein acquired values are stored, is concatenated to GV, at the utmost right (box 1005). A test is performed to determine if variable i has reached the last row (box 1010), i.e. if variable i is equal or not to eight in this example. If variable i has not reached the last row, i.e. if variable i is not equal to eight, variable i is incremented by one (box 1015) and the last two steps (boxes 1005 and 1010) are repeated.

Else, if variable i has reached the last row, i.e. if variable i is equal to eight, a second test is performed to determine whether or not variable j has reached the first column (box 1020), i.e. variable j is equal to zero or not. If variable j has not reached the first column, i.e. if variable j is not equal to zero, variable i is set to zero and variable j is decremented by one (box 1025), the last four steps (boxes 1005 to 1020) are repeated. Else, if variable j has reached the first column, i.e. if variable j is equal to zero, the process is stopped, the global value GV is constructed.

At this stage, a correction is required due to the principle of the method. As mentioned above, 81 sample values are used to construct the digital eye; however, only nine values are sampled each time, i.e. nine values are sampled for a particular position of the phase rotator. As a consequence, edges are detected too early as illustrated on the example of FIG. 11.

Figure 11:
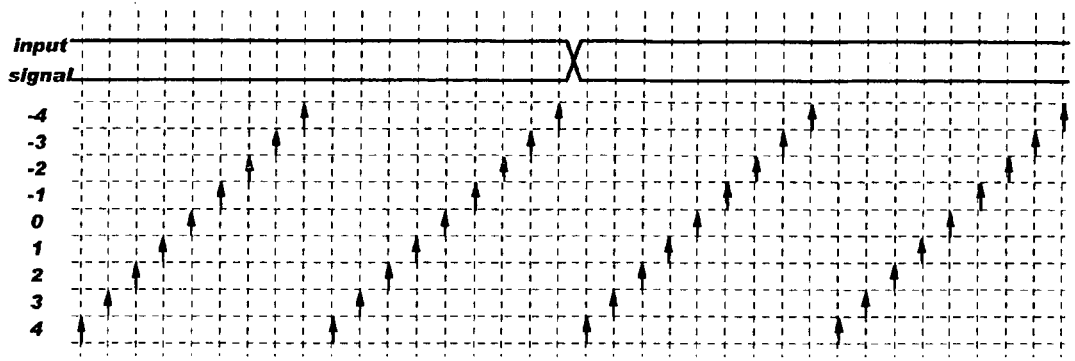
FIG. 11 illustrates the error introduced by the method of the third embodiment in the digital eye.

FIG. 11 illustrates a signal sampling, wherein only four values are sampled at a time for the sake of clarity. Using the input signal values, the edge position may be detected for phase rotator position −4 by determining the sampled value, shifting this sampled value of one to the right and XORing these values as follows:

sampled value: X X X X
shifted sampled value: .X X X
XOR(−4).0 1 0

The same may be done for phase rotator position −3, −2 and so on until phase rotator position four, that conducts to the following XOR results:

| | |
|---|---|
| XOR(−3) | .010 |
| XOR(−2) | .010 |
| XOR(−1) | .010 |
| XOR(0) | .010 |
| XOR(1) | .010 |
| XOR(2) | .010 |
| XOR(3) | .010 |
| XOR(4) | .010 |

Thus, the global value is:
000000000111111111000000000 wherein the first value equal to one corresponds to the position of the third sampled bit of phase rotator position −4 and the last value equal to one corresponds to the position of the third sampled bit of phase rotator position four.

However, it is noticeable from FIG. 11 that signal transitions have not been detected at each position between the position of the third sampled bit of phase rotator position −4 and the position of the third sampled bit of phase rotator position four but only after the position of the third sampled bit of phase rotator position four. Therefore, the correction consists in removing the eight false detections detected too early. The digital eye of the example of FIG. 11 is:
000000001000000000000000000 showing that the signal transition takes place before the position of the third sampled bit of phase rotator position four.

Now, turning back to the example of FIG. 9b for which the transformed global value is:
0000011111111111111111100000000001111111111110000000000000001111111 111111111110000 the correction consisting in removing the eight false detections detected too early gives the following digital eye:
00000111111111110000000000000000000111100000000 00000000000001111111 111000000000000

Figure 12:
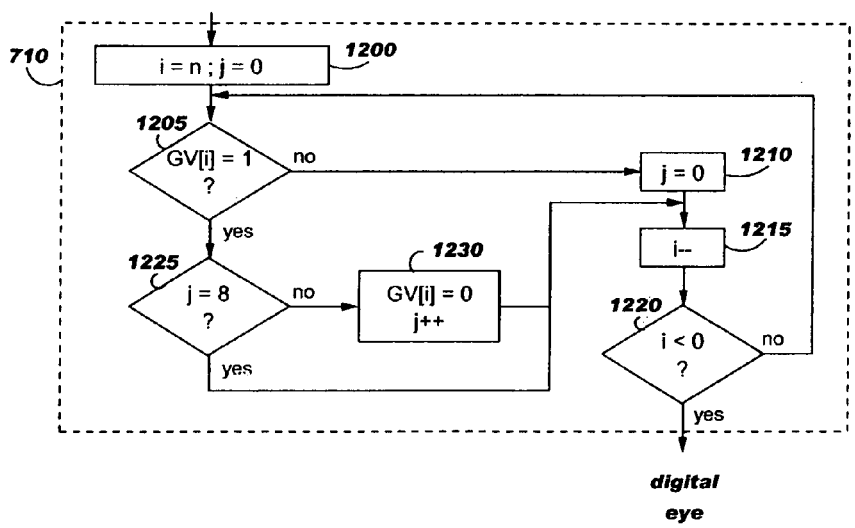
FIG. 12 represents an example of the algorithm used to correct formatted data in the method of the third embodiment.

FIG. 12 illustrates the algorithm used to correct the global value, i.e. box 710 of FIG. 7. A first step consists in initialising variables i and j (box 1200), variable i is set to n, the number of bit of the global value GV and variable j is set to zero. A first test is performed to determine whether or not the bit i of global value GV(GV[i]) is equal to one (box 1205). If GV[i] is not equal to one, variable j is set to zero (box 1210), variable i is decremented by one (box 1215) and a second test is performed to determine whether or not variable i is inferior to zero, i.e. if all the bits of global value GV have been examined (box 1220). If variable i is equal to or greater than zero, the process is repeated from box 1205 to test new bit GV[i]. Else, if i is inferior ti zero, the process is stopped, the digital eye has been constructed. If GV[i] is equal to one (box 1205), another test is done to determine whether or not variable j is equal to the number of positions reached by the phase rotator minus one i.e., eight in this example (box 1225). If variable j is not equal to eight, the $i^{th}$ bit of global value (GV[i]) is set to zero, variable j is incremented by one (box 1230) and the process is branched to box 1215 described above. Else, if variable j is equal to eight, the process is directly branched to box 1215.

Thus, at the end of the process described by reference to FIG. 12, the digital eye is constructed and may be used to determine the quality Q of the high-speed received signal. For instance, the quality Q may be determined by counting the number of zero per period. Considering the previous example, the quality is Q=18 for the first period and Q=22 for the second. A mean value Q=20 (Q=(18+22)/2) may be used in the algorithm of FIG. 2.

Figure 13:
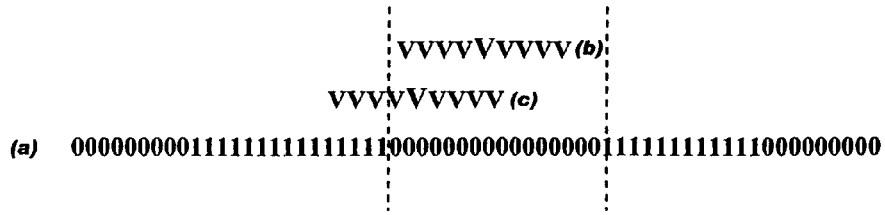
FIG. 13 shows how to determine if sampled values are correct or may be false in the method of the third embodiment.

As mentioned above, the phase rotator is locked during the construction of the digital eye. The main consequence is that, if the system is used during the construction of the digital eye, a sampling value may be false since the phase rotator is not automatically adjusted. Since the position of the phase rotator is moved from four positions to the right to four positions to the left, the validity of the sampled value may be determined by comparing a window of nine positions wherein signals may be sampled, centred on the sampling position that is automatically determined by the phase rotator before it is externally controlled, with the digital eye. If the nine position window overlaps a position wherein at least one signal transition has been detected, sampled value may be false; else, if the nine position window does not overlap a position wherein at least one signal transition has been detected, the sample value is correct, as illustrated in FIG. 13 wherein curve (a) is a digital eye and curves (b) and (c) represent the nine position window without overlapping and with overlapping, respectively. The bigger 'V' shows the sampling position that is automatically determined by the phase rotator before it is externally controlled and the other 'V' illustrates the positions examined when the method is conducted.

Naturally, in order to satisfy local and specific requirements, a person skilled in the art may apply to the solution described above many modifications and alterations, all of which, however, are included within the scope of protection of the invention as defined by the following claims.

What is claimed is:

1. An automatic parameter adjustment method for use with a synchronous high-speed transmission system which includes an emitter and a receiver, the method comprising:
    evaluating the quality of a signal received by the receiver over a high speed link, which signal was emitted by the emitter using a set of parameter values, wherein evaluating includes determining a digital eye by over-sampling the received signal, XORing the sample of the over-sampled received signal and the over-sampled received signal shifted by 1 bit, wherein the digital eye characterizes positions of signal transitions;

repeating the step of evaluating for signals emitted by the emitter using a plurality of sets of parameter values;

determining a number of signal transitions for each signal based on the digital eyes, wherein the number of signal transitions corresponds to the quality of the received signals;

selecting the set of parameter values which provides a desired signal quality;

requesting the emitter to use the determined set of parameter values; and employing the requested set of parameter values to emit signals.

2. The method of claim 1 wherein the emitter includes a controller and wherein the step of requesting includes sending a request to the controller.

3. The method of claim 1 wherein the set of parameter values is selected from a predetermined plurality of sets of parameter values.

4. The method of claim 3 wherein the step of repeating includes repeating the step of evaluating for signals emitted by the emitter using each of the predetermined plurality of sets of parameter values, and wherein the desired signal quality is the best signal quality.

5. The method of claim 1 wherein the step of evaluating includes over-sampling the received signal to determine the position of a signal transition.

6. The method of claim 1 wherein the receiver includes a sampler controlled by a phase rotator, and wherein the step of evaluating includes analyzing the behavior of the phase rotator.

7. The method of claim 1 including using the results of the XOR operations to evaluate the quality of the received signals.

8. The method of claim 1 wherein the receiver includes a sampler controlled by a phase rotator and wherein determining a digital eye includes performing the steps of over-sampling, XORing, and repeating with the phase rotator set at a plurality of positions.

9. A method comprising:

using a signal emitter to emit a plurality of digital signals using a parameter value;

receiving the plurality of signals;

evaluating the quality of the received signals by determining digital eyes that characterize position of signal transitions of the received signals, wherein determining the digital eyes includes over-sampling the received signals, XORing the samples of the over-sampled received signals and the over-sampled received signals shifted by 1 bit;

automatically repeating the steps of using, receiving, and evaluating using a predetermined plurality of different parameter values;

selecting a best parameter value from the plurality of different parameter values based the number of signal transitions; and setting the parameter value of the signal emitter to the value which provides the best signal quality.

10. The method of claim 9 including using a phase rotator to sample the received signals.

11. The method of claim 10 wherein the step of evaluating includes analyzing the behavior of the phase rotator.

12. The method of claim 10 including moving the phase rotator to a plurality of positions and sampling a received signal at each position.

13. The method of claim 9 further including using the signal transitions to determine signal clocks for the received signals.

14. The method of claim 9 further including employing a phase rotator to determine the digital eyes.

15. The method of claim 9 further including selecting the different parameter values from predetermined parameter values.

16. An apparatus comprising:

a first controller which provides different parameter values to a signal emitter based on a request;

a second controller which evaluates the quality of signals emitted by the signal emitter using a plurality of different parameters and received by a receiver, wherein evaluating includes determining digital eyes that characterize positions of signal transitions of the received signals by over-sampling the received signals, XORing the samples of the over-sampled received signals and the over-sampled received signals shifted by 1 bit, and determining a quality value for each parameter value based on a number of signal transitions indicated in the digital eyes, and wherein the second controller sends a request to the first controller to use the parameter value which provides the best quality of signal.

17. The apparatus of claim 16 wherein the signals are high speed synchronous signals.

18. The apparatus of claim 16 wherein the different parameter values include a predetermined plurality of parameter values.

19. The apparatus of claim 16 wherein the receiver includes a sampler controlled by a phase rotator.

20. The apparatus of claim 19 wherein evaluating includes analyzing a behavior of the phase rotator.

* * * * *